(12) United States Patent
Fujisaki

(10) Patent No.: US 6,748,325 B1
(45) Date of Patent: Jun. 8, 2004

(54) NAVIGATION SYSTEM

(76) Inventor: Iwao Fujisaki, 3-5-8-313, Musashinoshi, Kichijouji, Kitamachi, Tokyo 180-0001 (JP)

( * ) Notice: Subject to any disclaimer, the term of this patent is extended or adjusted under 35 U.S.C. 154(b) by 5 days.

(21) Appl. No.: 10/065,849

(22) Filed: Nov. 26, 2002

Related U.S. Application Data

(60) Provisional application No. 60/336,875, filed on Dec. 7, 2001.

(51) Int. Cl.$^7$ .............................................. G06F 17/00
(52) U.S. Cl. .................................................. 701/301
(58) Field of Search ................................ 701/300, 301, 701/302, 213; 342/46, 29, 41, 357.01, 357.06, 357.08; 340/988, 903, 945, 961, 436

(56) References Cited

U.S. PATENT DOCUMENTS

| | | |
|---|---|---|
| 4,835,537 A | 5/1989 | Manion |
| 5,043,903 A | 8/1991 | Constant |
| 5,111,400 A | 5/1992 | Yoder |
| 5,153,836 A | 10/1992 | Fraughton |
| 5,313,201 A | 5/1994 | Ryan |
| 5,325,302 A | 6/1994 | Izidon et al. |
| 5,381,338 A | 1/1995 | Wysocki |
| 5,404,135 A | 4/1995 | Janex |
| 5,414,631 A | 5/1995 | Denoize et al. |
| 5,416,713 A | 5/1995 | Kameda et al. |
| 5,448,233 A | 9/1995 | Saban et al. |
| 5,450,329 A | 9/1995 | Tanner |
| 5,477,459 A * | 12/1995 | Clegg et al. ................ 701/300 |
| 5,488,563 A | 1/1996 | Chazelle et al. |
| 5,493,309 A | 2/1996 | Bjornholt |
| 5,548,515 A | 8/1996 | Pilley |
| 5,548,516 A | 8/1996 | Gudat et al. |
| 5,566,073 A | 10/1996 | Margolin |
| 5,574,469 A | 11/1996 | Hsu |
| 5,574,648 A | 11/1996 | Pilley |
| 5,581,250 A | 12/1996 | Khvilivitzky |
| 5,587,904 A | 12/1996 | Ben-Yair et al. |
| 5,596,332 A | 1/1997 | Coles et al. |
| 5,610,815 A | 3/1997 | Gudat et al. |
| 5,615,116 A | 3/1997 | Gudat et al. |
| 5,629,691 A | 5/1997 | Jain |
| 5,638,282 A | 6/1997 | Chazelle et al. |
| 5,677,841 A | 10/1997 | Shiomi et al. |
| 5,740,047 A | 4/1998 | Pilley |
| 5,786,773 A | 7/1998 | Murphy |
| 5,838,262 A | 11/1998 | Kershner et al. |
| 5,839,080 A | 11/1998 | Muller et al. |
| 5,867,804 A | 2/1999 | Pilley |
| 5,870,101 A | 2/1999 | Murata et al. |
| 5,872,526 A | 2/1999 | Tognazzini |
| 5,884,223 A | 3/1999 | Tognazzini |
| 5,890,079 A | 3/1999 | Levine |
| 5,892,462 A | 4/1999 | Tran |
| 5,904,724 A | 5/1999 | Margolin |
| 5,920,321 A | 7/1999 | Owen et al. |
| 5,923,293 A | 7/1999 | Smith et al. |
| 5,933,099 A | 8/1999 | Mahon |
| 5,936,552 A | 8/1999 | Wichgers et al. |
| 5,963,167 A | 10/1999 | Lichten et al. |
| 5,964,822 A | 10/1999 | Alland et al. |
| 5,978,737 A | 11/1999 | Pawlowski et al. |
| 5,983,161 A | 11/1999 | Lemelson |
| 5,991,688 A | 11/1999 | Fukushima et al. |
| 6,002,347 A | 12/1999 | Daly et al. |
| 6,006,158 A | 12/1999 | Pilley |
| 6,018,347 A | 1/2000 | Willis |
| 6,021,374 A | 2/2000 | Wood |
| 6,023,278 A | 2/2000 | Margolin |
| 6,049,756 A | 4/2000 | Libby |
| 6,076,042 A | 6/2000 | Tognazzini |
| 6,088,654 A | 7/2000 | Lepere et al. |
| 6,094,607 A | 7/2000 | Diesel |

(List continued on next page.)

Primary Examiner—Yonel Beaulieu

(57) ABSTRACT

A carrier, such as an airplane, which outputs a warning sign if an artificial structure, such as a building, is in its path. The CPU of the carrier calculates the path by referring to the destination data representing the destination of the carrier.

6 Claims, 13 Drawing Sheets

U.S. PATENT DOCUMENTS

| | | | |
|---|---|---|---|
| 6,122,570 A | 9/2000 | Muller et al. |
| 6,127,944 A | 10/2000 | Daly et al. |
| 6,133,867 A | 10/2000 | Eberwine |
| 6,134,500 A | 10/2000 | Tang et al. |
| 6,144,915 A | 11/2000 | Shiomi et al. |
| 6,157,891 A | 12/2000 | Lin |
| 6,160,497 A | 12/2000 | Clark |
| 6,163,755 A | 12/2000 | Peer et al. |
| 6,177,943 B1 | 1/2001 | Margolin |
| 6,182,005 B1 | 1/2001 | Pilley |
| 6,195,609 B1 | 2/2001 | Pilley |
| 6,201,482 B1 | 3/2001 | Schiefele et al. |
| 6,216,065 B1 | 4/2001 | Hall et al. |
| 6,219,592 B1 | 4/2001 | Muller et al. |
| 6,219,618 B1 | 4/2001 | Bateman |
| 6,246,320 B1 | 6/2001 | Monroe |
| 6,253,064 B1 | 6/2001 | Monroe |
| 6,266,617 B1 | 7/2001 | Evans |
| 6,271,768 B1 | 8/2001 | Frazier, Jr. et al. |
| 6,275,773 B1 | 8/2001 | Lemelson |
| 6,281,832 B1 | 8/2001 | McElreath |
| 6,285,320 B1 | 9/2001 | Olster et al. |
| 6,292,721 B1 | 9/2001 | Conner et al. |
| 6,304,050 B1 | 10/2001 | Skaar |
| 6,311,108 B1 | 10/2001 | Ammar |
| 6,314,363 B1 | 11/2001 | Pilley |
| 6,317,690 B1 | 11/2001 | Gia |
| 6,320,579 B1 | 11/2001 | Snyder et al. |
| 6,330,987 B1 | 12/2001 | Scott |
| 6,340,289 B1 | 1/2002 | Vos et al. |
| 6,347,263 B1 | 2/2002 | Johnson et al. |
| 6,348,877 B1 | 2/2002 | Berstis et al. |
| 6,370,475 B1 | 4/2002 | Breed et al. |
| 6,377,263 B1 | 4/2002 | Falacara et al. |
| 6,380,869 B1 | 4/2002 | Simon et al. |
| 6,380,870 B1 | 4/2002 | Conner et al. |
| 6,381,541 B1 | 4/2002 | Sadler |
| 6,393,362 B1 | 5/2002 | Burns |
| 6,401,038 B2 | 6/2002 | Gia |
| 6,405,132 B1 | 6/2002 | Breed et al. |
| 6,405,975 B1 | 6/2002 | Sankrithi et al. |
| 6,415,219 B1 | 7/2002 | Degodyuk |
| 6,433,729 B1 | 8/2002 | Staggs |
| 6,438,491 B1 | 8/2002 | Farmer |
| 6,438,492 B1 | 8/2002 | Le Tallec et al. |
| 6,442,485 B2 | 8/2002 | Evans |
| 6,445,310 B1 | 9/2002 | Bateman et al. |
| 6,456,940 B1 | 9/2002 | Higgins |
| 6,456,941 B1 | 9/2002 | Gutierrez |
| 6,459,411 B2 | 10/2002 | Frazier et al. |
| 6,472,982 B2 | 10/2002 | Eida et al. |
| 6,480,120 B1 | 11/2002 | Meunier |
| 6,480,789 B2 | 11/2002 | Lin |
| 6,484,071 B1 | 11/2002 | Conner et al. |
| 6,487,500 B2 | 11/2002 | Lemelson et al. |
| 6,501,424 B1 | 12/2002 | Haendel et al. |
| 6,512,975 B2 | 1/2003 | Watson |
| 6,512,976 B1 * | 1/2003 | Sabatino et al. ............ 701/207 |

* cited by examiner

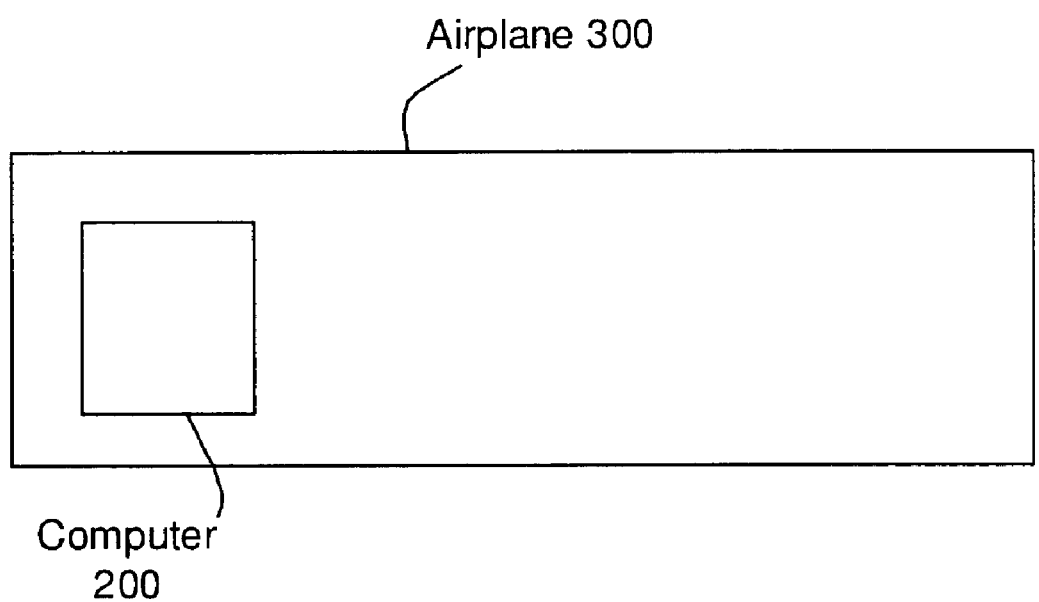

RAM 206

Area 501

3D Object 401
3D Object 402
3D Object 403
3D Object 404
3D Object 405
Airplane 300

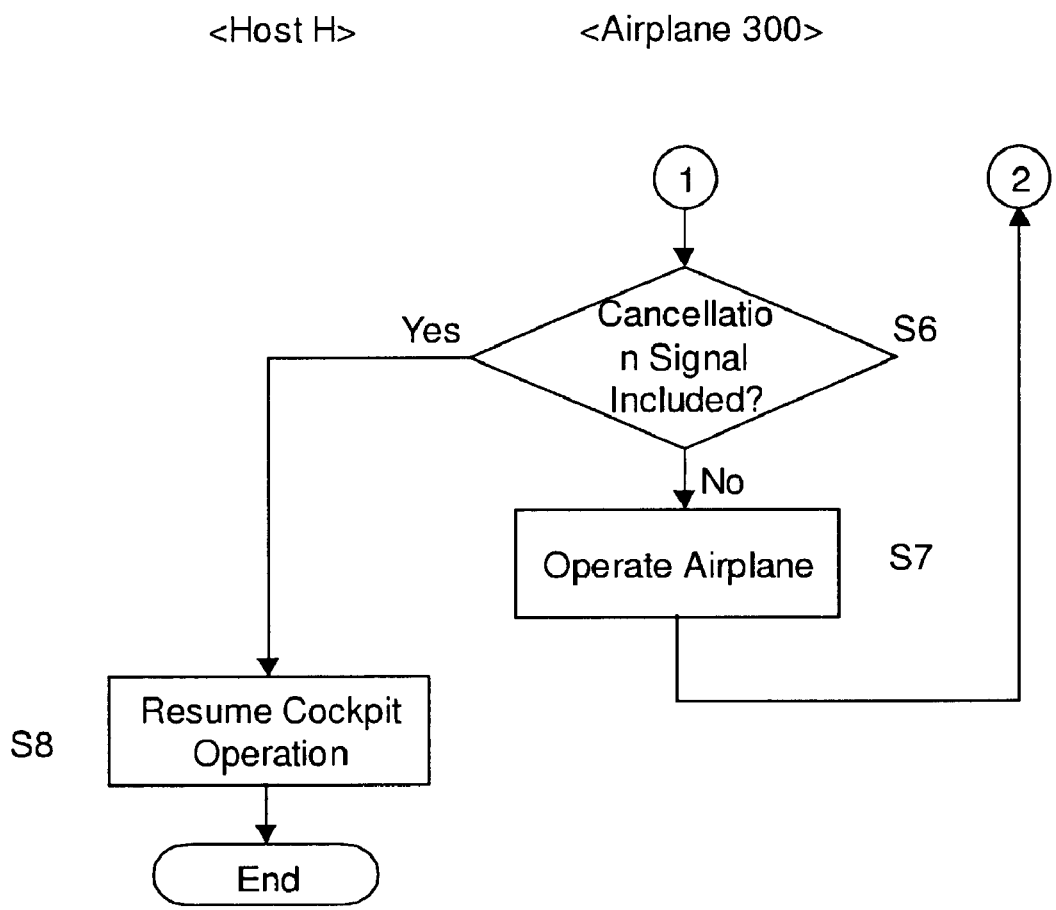

Response Signal 601

Header 602  Response Data 603  Footer 604

Command Signal 605

Header 606  Command Data 607  Footer 608

NAVIGATION SYSTEM

CROSS REFERENCE TO RELATED APPLICATIONS

This application claims the benefit of U.S. Provisional Application No. 60/336,875, filed Dec. 7, 2001, which is hereby incorporated herein by reference in its entirety.

BACKGROUND OF INVENTION

The invention relates to navigation system and more particularly to that of airplanes, space shuttles, gliders, and all other types of carriers.

U.S. Pat. No. 5,566,073 introduces a pilot aid using synthetic reality consists of a way to determine the aircraft's position and attitude such as by the global positioning system (GPS), a digital data base containing three-dimensional polygon data for terrain and manmade structures, a computer, and a display. According to this prior art, the computer uses the aircraft's position and attitude to look up the terrain and manmade structure data in the data base and by using standard computer graphics methods creates a projected three-dimensional scene on a cockpit display. This presents the pilot with a synthesized view of the world regardless of the actual visibility. A second embodiment uses a head-mounted display with a head position sensor to provide the pilot with a synthesized view of the world that responds to where he or she is looking and which is not blocked by the cockpit or other aircraft structures. A third embodiment allows the pilot to preview the route ahead or to replay previous flights.

U.S. Pat. No. 5,574,648 introduces an improved airport control/management system for controlling and managing the surface and airborne movement of vehicular and aircraft within a defined and selected airport space envelope of an airport, the traffic, comprising apparatus for establishing a precise 3-dimensional digital map of the selected airport space envelope, the map containing GNSS positioning system reference points, a computer with a monitor screen for receiving and displaying the 3-dimensional map, transmit and receive radio equipment located on at least one vehicle/aircraft in the airport space envelope to generate and transmit continuous GNSS-based location reports a receiver associated with the computer to receive the reports from the vehicle/aircraft, programming associated with the computer and using the reports to superimpose 3-dimensional image corresponding to a path of the vehicle/aircraft onto the 3-dimensional map, apparatus associated with the 3-dimensional map for generating airport control and management signals as a function of the vehicle/aircraft path and computer aided design programming for manipulation of the 3-dimensional map and the image of the vehicle/aircraft and the path to a desired apparent line of observation, to control the traffic in the airport, the improvement comprising: the layering of the airport map creating a layered airport map having at least one layer, the layering permitting thereby sorting and tracking of each of the vehicle/aircraft, each of the layers selected from the group determined by function consisting of air traffic control phase of flight, notams, forbidden zone identification, airline and airport operations. The invention may also include systems and apparatus for identifying the type of vehicle and the 3-dimensional orientation of same.

U.S. Pat. No. 5,867,804 introduces a method and system supporting seamless 3-dimensional operations in a multi-dimensional environment using orbiting satellite compatible coordinate references and databases. According to this prior art, the system includes a control and management element and an aircraft/surface vehicle element. The two elements utilize a common worldwide coordinate reference frame and a common time reference for its operation. Precise collision detection, navigation and 3-dimensional situational awareness functions are performed using precise vector processing algorithms in combination compatible databases. Seamless air and ground operations are supported in such a fashion that the overall processing mathematics are directly applicable anywhere around the globe, only the specific databases need change for any given site. No regional distance scaling corrections or discontinuity compensations are required from site to site anywhere around the globe. Such a system greatly simplifies the operation of airports and other 4-dimensional environments. The simplicity of this system provides high availability and reduced system exposure to single point failures, while providing superior performance for air traffic controllers and aircraft/surface vehicle operators in the 3-dimensional space envelope.

U.S. Pat. No. 5,870,101 introduces an image synthesizing system is provided which can output a high-quality image in real time through the texture mapping without preventing the hardware from being increased in speed and reduced in scale. According to this prior art, a 3-D image is formed by a game space processing unit (13) and image supply unit (10) to perform a 3-D computation. At a processor unit (30), coordinates for each dot in a polygon and the corresponding texture coordinates are determined. A field buffer unit (40) stores the texture coordinates at an address specified by the coordinates for each dot. A texture data storage unit (42) has stored a rendering data. The texture coordinates are read out from the field buffer unit (40) and then used to read out the rendering data from the texture coordinate storage unit (42) to synthesize and output a pseudo 3-D image. By thus storing the texture coordinates in the field buffer unit (40), the subsampling/interpolation and the like may be carried out.

U.S. Pat. No. 5,904,724 introduces a method and apparatus that allows a remote aircraft to be controlled by a remotely located pilot who is presented with a synthesized three-dimensional projected view representing the environment around the remote aircraft. According to this prior art, a remote aircraft transmits its three-dimensional position and orientation to a remote pilot station. The remote pilot station applies this information to a digital database containing a three dimensional description of the environment around the remote aircraft to present the remote pilot with a three dimensional projected view of this environment. The remote pilot reacts to this view and interacts with the pilot controls, whose signals are transmitted back to the remote aircraft. In addition, the system compensates for the communications delay between the remote aircraft and the remote pilot station by controlling the sensitivity of the pilot controls.

U.S. Pat. No. 5,920,321 introduces an FMS with a three dimensional representation of the flight plan is disclosed. According to this prior art, the view is adjustable via a joystick or other similar controller and is capable numerous varied views, including both a two dimensional lateral view and a two dimensional elevation view. Software is used to effect the changing views.

U.S. Pat. No. 5,963,167 introduces an improved analyzing system based on GIPSY-OASIS II software package developed at the Jet Propulsion Laboratory for Global Positioning System, general satellite tracking, orbit determination and trajectory studies. According to this prior art, new features and functions include yaw compensation, precise satellite positioning by high-rate GPS clocks, enhanced data filtering and smoothing, a new user interface for controlling orientation of a satellite and its components, and no-fiducial approach to global geodesy. The present invention allows a fully automatic operation and delivery of validated daily solutions for orbits, clocks, station locations and others with no human intervention. A 3D GPS orbit accuracy of 15 cm and the daily repeatability of the 3D global geocentric station location in better than 1 cm have been achieved.

U.S. Pat. No. 5,983,161 introduces GPS satellite (4) ranging signals (6) received (32) on comm1, and DGPS auxiliary range correction signals and pseudolite carrier phase ambiguity resolution signals (8) from a fixed known earth base station (10) received (34) on comm2, at one of a plurality of vehicles/aircraft/automobiles (2) are computer processed (36) to continuously determine the one's kinematic tracking position on a pathway (14) with centimeter accuracy. According to this prior art, GPS-based position is communicated with selected other status information to each other one of the plurality of vehicles (2), to the one station (10), and/or to one of a plurality of control centers (16), and the one vehicle receives therefrom each of the others' status information and kinematic tracking position. Objects (22) are detected from all directions (300) by multiple supplemental mechanisms, e.g., video (54), radar/lidar (56), laser and optical scanners. Data and information are computer processed and analyzed (50,52,200,452) in neural networks (132, FIGS. 6–8) in the one vehicle to identify, rank, and evaluate collision hazards/objects, an expert operating response to which is determined in a fuzzy logic associative memory (484) which generates control signals which actuate a plurality of control systems of the one vehicle in a coordinated manner to maneuver it laterally and longitudinally to avoid each collision hazard, or, for motor vehicles, when a collision is unavoidable, to minimize injury or damage therefrom. The operator is warned by a heads up display and other modes and may override. An automotive auto-pilot mode is provided.

U.S. Pat. No. 5,991,688 introduces a route setting method for use in a navigation system for navigating a movable body which is provided with a process area setting process of setting a process area, which corresponds to a present position of the movable body, includes a plurality of route points and has a size based on a performance of a recovery route searching process, in case that the present position of the movable body does not exist on a set route from an original departure point to a final destination point. According to this prior art, the set route includes the route points and is set in advance. The route setting method is also provided with: a route point searching process of searching a closest route point, which is the closest to the final destination point among the route points on a boundary of or within the set process area; and the recovery route searching process of searching a recovery route from the present position of the movable body to the searched closest route point.

U.S. Pat. No. 6,006,158 introduces an Airport Guidance System and Method which provides for GNSS compatible seamless airport guidance capability. According to this prior art, the computer system provides a automated lighting functions based upon GNSS based position and spatially compatible databases. The system and method utilize precise GNSS compatible zones, the Earth Centered Earth Fixed (ECEF) WGS-84 coordinate reference frame, GNSS compatible local coordinate frames such as local and state plane grids, zone-based automated airport lighting control, travel path information management processes which allow for the intelligent control of airport lighting systems. True airport independent processing is achieved when the ECEF coordinate reference frame is utilized. The lighting methods and processes are applicable to vehicles and aircraft operating in a controlled airport space envelope as well as other remote user sites with or without the assistance of air traffic controller. The system utilizes broadcast Automatic Dependent Surveillance (ADS) information from participating aircraft and vehicles. Although the processing methods may be employed using other surveillance information derived from radar sources with some degradation in performance due to radar inaccuracies and inability to produce accurate 3-dimensional velocity. The methods and processes employed provide a fundamental framework for increased airport safety, operational efficiency, energy savings and improved automation.

U.S. Pat. No. 6,018,347 introduces a computer-implemented method for modeling a three-dimensional image with polygons having different levels of detail. According to this prior art, the method includes initially modeling the three-dimensional image with a first plurality of polygons at a first level of detail. The first level of detail represent the coarsest level of detail available for modeling the three-dimensional image. The first plurality of polygons are provided as part of an input data set. The method further includes comparing a distance between a first polygon of the first plurality of polygons and an eye point to a predefined threshold distance value associated with a level of detail of the first polygon. If the distance is less than the predefined threshold distance value, the method substitutes in a second plurality of polygons for the first polygon. The second plurality of polygons are at a second level of detail higher than the first level of detail and computed in advance prior to a commencement of the initial modeling step and provided as part of the input data set.

U.S. Pat. No. 6,021,374 introduces a stand alone terrain conflict detector of an aircraft which includes a global positioning system (GPS) receiver, an inertial navigation system, navigational and topographical databases, a control panel, a central processing unit (CPU), which CPU generates position data, a current flight path vector and control signals, an obstacle detector which receives the position data and the current flight path vector and which generates a flight path signal, an alert signal identifying a terrain threat to the aircraft and a projected flight path vector, a video generator coupled to the obstacle detector and the CPU, and a display connected to the video generator. According to this prior art, the display outputs one of a 2D image, a first 3D image and a second 3D image and the terrain threat generated by video generator. Advantageously, the video generator generates the 2D image responsive to the flight path signal and navigational data during the first mode of operation, generates the first 3D image including the projected flight path vector responsive to the flight path vector and one of navigational data and topographical data during the second mode of operation, and automatically generates, whenever the alert signal is generated, the second 3D image, including an escape vector, having a scale different than that of the first 3D image, responsive to the projected flight path vector and one of the navigational data and the topographical data during the third mode of operation. A method for operating the stand alone terrain conflict detector is also described.

U.S. Pat. No. 6,023,278 introduces a digital map system for displaying three dimensional terrain data which uses terrain data in the form of polygons. According to this prior art, the polygon database is produced from a database of elevation points which are divided into, for example, n.times.n (where n is a positive integer) squares which have an elevation point in the center of the square. The center point forms four polygons with the corners of the square. The elevation of the center point may be chosen to be the highest elevation point in the n.times.n square, the average elevation of the elevation points in the n.times.n square, the elevation of the actual center point, or other methods. The method chosen depends on how the data base is to be used. The size of the n.times.n square chosen also depends on how the data base is to be used since there is a tradeoff between the resolution of the displayed scene and the amount of data reduction from the original database of elevation points. The polygon database may be used in a pilot aid using a synthetic environment, a flight simulator, as part of the control system for a remotely piloted vehicle, or in a video game.

U.S. Pat. No. 6,049,756 introduces an apparatus for analyzing a specified path A-B with respect to a specified obstacle which determines a collision avoidance path when the path is determined to intersect the obstacle. According to this prior art, the apparatus is preferably a dedicated path analyzer that provides high speed path analysis support to a host computer performing navigation functions. The path analyzer includes a collision detector and a collision avoidance path generator. The path analyzer receives from the host computer coordinates representing the specified path's first and second endpoints (A and B) in three dimensional space and the specified obstacle's physical extent. The collision detector generates a preliminary result signal indicating whether the specified path does not intercept the specified obstacle, unavoidably intercepts the specified obstacle, or avoidably intercepts the specified obstacle. When the preliminary result signal indicates that the specified path avoidably intercepts the specified obstacle, the collision avoidance path generator selecting a vertex (C) of a parallelepiped corresponding to the specified obstacle's physical extent, such that a modified path A-C-B from the first specified path endpoint to the selected vertex to the second specified path endpoint circumnavigates the obstacle. The path analyzer returns signals to the host computer representing the preliminary result signal and, when the preliminary result signal indicates that the specified path avoidably intercepts the specified obstacle, the selected vertex.

U.S. Pat. No. 6,088,654 introduces a device for aiding aerial navigation, carried on board an aircraft, which receives on an input, status indications representing its spatial position and its velocity vector, and stores a 3D representation of the relief overflown. According to this prior art, it comprises processing define, as a function of the status indications, an exploration sector referred to the aircraft, and calculate in this sector a contour as a function of the intersection of this sector with the relief, with a view to the displaying thereof. The sector is defined by a sheet of trajectory lines obtained on the basis of the velocity vector and of auxiliary vectors calculated by shifting the velocity vector of the aircraft according to a chosen angular scanning law.

U.S. Pat. No. 6,094,607 introduces the apparatus which uses radar altimeter measurements and stored terrain altitude profiles to provide pre-filtered observations to a Kalman filter for estimating barometric offset at the airport runway, and barometric scale factor for offsets above the runway. According to this prior art, these offsets are used with the smoothed baro-inertial output from an inertial reference system to provide 3 dimensional constant rate of descent approach procedures to replace non-precision approach procedures based on constant barometric altitude step approaches. The horizontal positions used as reference for the stored terrain altitude profiles are obtained from a prior art navigation apparatus. The integrity of all measurements is assured by using long term averages of the Kalman filter residuals to detect failures. In addition, the estimated baro offset at the runway is compared for consistency with the baro offset obtained by the pilot from the airport by radio.

U.S. Pat. No. 6,133,867 introduces a collision avoidance system which utilizes a satellite navigational system to continuously determine object motion parameters relative to the earth's surface and exchanges this information with other objects. According to this prior art, the system calculates collision potential with other objects that are stationary or in motion based on the exchange of the motion parameters. Evasive actions are calculated with congested space and altitude floor taken into account. The system determines collision potential between two or more objects or can utilize a single ground monitor to perform the collision potential calculations between all participating objects.

U.S. Pat. No. 6,134,500 introduces a system and method for generating a minimum-cost airline flight plan from a point of origin through a set of fix points to a destination point. According to this prior art, a set of navigation airways from the point of origin to the destination point, including predefined fix points and vectors for high altitude flight, and a set of predetermined flight planning altitudes is stored in a database. Operational data for the flight and weather data for the flight is also stored in the database, as well as station data, station approach and departure procedures, predefined flight restricted areas, and flight performance data. The predefined fix points are transformed from the Cartesian plane onto a new coordinate system based on the great circle route between the origin and the destination. Each transformed fix point is assigned an ordinal value, and an acyclic network is constructed based on the ordinal values and within a feasible search region which excludes any flight restricted areas. Using dynamic programming techniques and shortest path optimization, a minimum cost flight path from the point of origin through a plurality of predefined navigation fix points to a destination point is calculated. The minimum cost flight path calculations take into account weather data for predetermined flight planning altitudes, aircraft weight and payload data, and performance data. The system comprises a general purpose computer having a memory, a database stored in the memory, and a means executing within the general purpose computer for determining the minimum cost flight path from a point of origin through a set of predefined navigation fix points to a destination point.

U.S. Pat. No. 6,177,943 introduces a digital elevation database which is compressed to create a compressed digital map database which is used by a digital computer system for displaying three-dimensional terrain data in the form of polygons. According to this prior art, the compressed digital map database is produced from a database of elevation points by selecting every mth row and every nth column, thereby resulting in a reduction of database storage requirements. During program run-time the intersection of rows and columns forms cells with four corners. The elevation value of a center elevation point for each cell is formed by various methods, thereby creating a cell made up of four three-dimensional triangles. One method for creating the elevation of the center elevation point uses the elevations of the four corners of the cell. Another method uses extrapolated elevation values from the cell's extended diagonals. The three-dimensional triangles formed from the center elevation point are then transformed and projected using standard computer graphics methods on a digital computer to produce a three-dimensional projected display.

U.S. Pat. No. 6,182,005 introduces an Airport Guidance System and Method which provides for GNSS compatible airport guidance capability. According to this prior art, the computer system provides automated navigation functions based upon GNSS based position and spatially compatible databases. The system and method utilize precise GNSS compatible zones, the Earth Centered Earth Fixed (ECEF) WGS-84 coordinate reference frame, GNSS compatible local coordinate frames such as local and state plane grids, zone-based automated airport control, travel path information management processes which allow for the intelligent control of airport traffic. True airport independent processing is achieved when the ECEF coordinate reference frame is utilized. The navigation methods and processes are applicable to vehicles and aircraft operating in a controlled airport space envelope as well as other remote user sites with or without the assistance of air traffic controller. The system utilizes broadcast Automatic Dependent Surveillance (ADS) information from participating aircraft and vehicles. Although the processing methods may be employed using other surveillance information derived from radar sources with some degradation in performance due to radar inaccuracies and inability to produce accurate 3-dimensional velocity. GNSS compatible guidance is provided by a GNSS compatible navigation capability utilizing GPS compatible mathematical processing. Guidance information is computed in the ECEF coordinate frame and displayed to the vehicle operator using a X,Y graticuled display indicating the current position with respect the true course. Other display formats involving the display of digital maps, and positions provide situational awareness. Situational awareness displays are supported with ECEF compatible incursion processing using GPS Position, Velocity and Time of applicability (PVT) information. The methods and processes employed provide a fundamental framework for increased airport safety, operational efficiency, energy savings and improved automation.

U.S. Pat. No. 6,246,320 introduces a comprehensive surveillance/communication system which supports communication of monitored data and/or commands or operational data between the ground or base station and the transport, between the transport and ground or terminal support vehicles and/or equipment, between the transport and various monitoring stations or systems, between transports, between the ground station and the support vehicles, between the monitoring station and support vehicles and between the monitoring stations or systems and the support vehicles. According to this prior art, this permits the ground station to monitor and/or determine the identity, location, and heading of any vehicle in its range for tracking and collision avoidance, as well as monitoring sensor information, alarm conditions, emergency conditions, servicing requests, maintenance information, navigational information, requests for information such as flight plans, weather information, route maps, message traffic such as e-mail and the like. Similar information may be transmitted and received between any combination of transports, monitoring stations, personnel, mobile units and support vehicles. Operational commands may also be transmitted utilizing the system of the invention.

U.S. Pat. No. 6,253,064 introduces a traffic management, security and surveillance system for commercial vehicles which incorporates a plurality of strategically located sensors for identifying the location of both commercial vehicles and support assets, as well as personnel, for monitoring traffic flow and supporting traffic management of the commercial vehicles, assets and personnel while in the area. According to this prior art, the location signals are transmitted to a ground based monitoring and control center and may be archived for later playback. The system also is adapted for utilizing on board location signal generators such as GPS sensors to provide traffic flow information and traffic management of all commercial vehicles, assets and personnel on the system.

U.S. Pat. No. 6,275,773 introduces GPS satellite (4) ranging signals (6) received (32) on comm 1, and DGPS auxiliary range correction signals and pseudolite carrier phase ambiguity resolution signals (8) from a fixed known earth base station (10) received (34) on comm2, at one of a plurality of vehicles/aircraft/automobiles (2) which are computer processed (36) to continuously determine the one's kinematic tracking position on a pathway (14) with centimeter accuracy. According to this prior art, that GPS-based position is communicated with selected other status information to each other one of the plurality of vehicles (2), to the one station (10), and/or to one of a plurality of control centers (16), and the one vehicle receives therefrom each of the others' status information and kinematic tracking position. Objects (22) are detected from all directions (300) by multiple supplemental mechanisms, e.g., video (54), radar/lidar (56), laser and optical scanners. Data and information are computer processed and analyzed (50,52,200,452) in neural networks (132, FIGS. 6–8) in the one vehicle to identify, rank, and evaluate collision hazards/objects, an expert operating response to which is determined in a fuzzy logic associative memory (484) which generates control signals which actuate a plurality of control systems of the one vehicle in a coordinated manner to maneuver it laterally and longitudinally to avoid each collision hazard, or, for motor vehicles, when a collision is unavoidable, to minimize injury or damage therefrom. The operator is warned by a heads up display and other modes and may override. An automotive auto-pilot mode is provided.

U.S. Pat. No. 6,285,320 introduces an apparatus and method for mapping surfaces of an object, such as a structure or vehicle, that utilizes transceivers mounted on portable support structures to orient a probe to form a local global positioning satellite (GPS) system. According to this prior art, the probe is placed on reference points of the object and information related to the reference point is input into a data processor. The processor uses the reference points are used to identify and orient the object, and a model of the object is retrieved from memory. Additional position data of the object is gathered and processed to generate a graphical image of the object being mapped. The model is compared to the mapped image of the object and structural damage is assessed. Information relating to repair procedures is output to a workstation and the area under repair can be mapped to evaluate the success of the repair procedure.

U.S. Pat. No. 6,304,050 introduces a system that creates vision-based, three-dimensional control of a multiple-degree-of-freedom dexterous robot, without special calibration of the vision system, the robot, or any of the constituent parts of the system, and that allows high-level human supervision or direction of the robot. According to this prior art, the human operator uses a graphical user interface (GUI) to point and click on an image of the surface of the object with which the robot is to interact. Directed at this surface is the stationary selection camera, which provides the image for the GUI, and at least one other camera. A laser pointer is panned and tilted so as to create, in each participating camera space, targets associated with surface junctures that the user has selected in the selection camera. Camera-space manipulation is used to control the internal degrees of freedom of the robot such that selected points on the robot end member move relative to selected surface points in a way that is consistent with the desired robot operation. As per the requirement of camera-space manipulation, the end member must have features, or "cues", with known location relative to the controlled end-member points, that can be located in the images or camera spaces of participant cameras. The system is extended to simultaneously control tool orientation relative to the surface normal and/or relative to user-selected directions tangent to the surface. The system is extended in various ways to allow for additional versatility of application.

U.S. Pat. No. 6,311,108 introduces an aircraft guidance system which uses radar imaging to verify airport and runway location and provide navigation updates. According to this prior art, the system is applicable to flight operations in low visibility conditions.

U.S. Pat. No. 6,314,363 introduces an Airport Control and Management System and Methods for use by an air traffic controller, pilots and vehicle drivers which provides for a GNSS compatible computer processing environment which supports airport control and management functions in the air and on the ground. According to this prior art, the computer system provides for automation and a computer human interface supporting air traffic controller functions. The processing environment is based upon GNSS compatible position, velocity, time information and GNSS spatially compatible databases. The computer human interface combines the data entry role of issuing clearances with automated routing, conformance monitoring and lighting control functions. The system and methods utilize precise GNSS compatible zones, the Earth Centered Earth Fixed (ECEF) WGS-84 coordinate reference frame, GNSS compatible local coordinate frames such as local and state plane grids, travel path information management processes which allow for the intelligent control of airport lighting systems. True airport independent processing is achieved when the ECEF coordinate reference frame is utilized. The system utilizes broadcast Automatic Dependent Surveillance (ADS) information from participating aircraft and vehicles. Although the processing methods may be employed using other surveillance information derived from radar of multi-lateration sources with some degradation in performance due to radar inaccuracies and inability to produce accurate 3-dimensional GNSS compatible velocity. Radio receiving equipment receives the broadcast ADS information which is then supplied to the computer system. The computer system utilizes GNSS compatible position and velocity data to control the operation of airport lights using zone incursion processing methods. The methods and processes employed provide a fundamental framework for increased airport safety, operational efficiency, energy savings and improved automation resulting in reduced controller workload.

U.S. Pat. No. 6,320,579 introduces a primary flight display (PFD) for an aircraft generating a 3-dimensional (3D) symbology indicative of the aircraft situational information. According to this prior art, the 3D symbology includes a 3D vertical path error symbol and a 3D lateral flight path error symbol. Several 3D altitude symbols are also displayed which collectively render a 3D representation of the aircraft situation. The 3D symbology enhances the pilot's awareness of the aircraft situation to accurately control the aircraft, and to easily to monitor the performance during manual and automatic flight.

U.S. Pat. No. 6,330,987 introduces apparatus and methods for performing satellite proximity operations such as inspection, recovery and life extension of a target satellite through operation of a "Satellite Inspection Recovery and Extension" ("SIRE") spacecraft which can be operated in the following modes (teleoperated, automatic, and autonomous). According to this prior art, the SIRE concept further consists of those methods and techniques used to perform certain (on-orbit) operations including, but not limited to, the inspection, servicing, recovery, and lifetime extension of satellites, spacecraft, space systems, space platforms, and other vehicles and objects in space, collectively defined as "target satellites". The three basic types of SIRE proximity missions are defined as "Lifetime Extension", "Recovery", and "Utility". A remote cockpit system is provided to permit human control of the SIRE spacecraft during proximity operations.

U.S. Pat. No. 6,340,289 introduces Method and apparatus for controlling an aircraft engine with a single, manually-operable lever which includes structure and function for generating a pilot thrust command from the single lever. According to this prior art, a processor is coupled to the single lever and (i) receives the generated pilot thrust command, (ii) receives a plurality of detected ambient air flight conditions, (iii) receives a plurality of detected engine performance parameters, (iv) determines first and second engine control commands based on the received pilot thrust command, the detected ambient air flight conditions, and the engine performance parameters, and (v) outputs first and second output signals respectively corresponding to the first and second engine control commands. Preferably, the engine control commands comprise propeller RPM and engine inlet manifold air pressure commands, and the detected ambient air flight conditions comprise air speed and altitude.

U.S. Pat. No. 6,370,475 introduces system and method for preventing vehicle accidents in which the absolute position of the vehicle is determined, e.g., using a satellite-based positioning system such as GPS, and the location of the vehicle relative to the edges of the roadway is then determined based on the absolute position of the vehicle and stored data relating to edges of roadways on which the vehicle may travel. According to this prior art, a system or component within the vehicle is initiated, e.g., an alarm or warning system, or the operation of a system or component is affected, e.g., an automatic guidance system, if the location of the vehicle approaches close to an edge of the roadway or intersects with an edge of the roadway.

U.S. Pat. No. 6,377,263 introduces a system and method for creating a virtual reality. According to this prior art, the virtual reality is efficiently constructed by providing a framework, or paradigm, in which the various aspects of the virtual world may be separately constructed, and then brought together at runtime to create the desired virtual reality. The framework includes views, which are windows into a virtual world, virtual worlds which are complete 3D models of the virtual reality, and modular components which are beings (or entities or creatures) that populate the virtual world. The components have both a graphical (visual) model and a behavioral model. The graphical model and behavioral model are independent software modules that may be reused with other components. Included with the modules are attributes, rules, and other parameters that may be used to affect the basic visual appearance and behavior of a component. Components may inherit from other components. The graphical model of a component is constructed from a hierarchy of parts.

U.S. Pat. No. 6,405,132 introduces system and method for preventing vehicle accidents in which GPS ranging signals relating to a host vehicle's position on a roadway on a surface of the earth are received on a first communication link from a network of satellites and DGPS auxiliary range correction signals for correcting propagation delay errors in the GPS ranging signals are received on a second communication link from a station or satellite. According to this prior art, the host vehicle's position on a roadway on a surface of the earth is determined from the GPS, DGPS, and accurate map database signals with centimeter accuracy and communicated to other vehicles. The host vehicle receives position information from other vehicles and determines whether any other vehicle from which position information is received represents a collision threat to the host vehicle based on the position of the other vehicle relative to the roadway and the host vehicle. If so, a warning or vehicle control signal response to control the host vehicle's motion is generated to prevent a collision with the other vehicle.

U.S. Pat. No. 6,405,975 introduces a system for aiding ground maneuvering of an airplane. According to this prior art, the system includes at least one camera mounted on the airplane for generating video images of at last one gear with tires, preferably a main or nose landing gear and the surrounding ground. The cockpit of the airplane includes a video display device that displays the generated video images and a user interface that allows selection of the format for displaying the generated video images. A camera mounted within a moveable component of the airplane is mounted on a movable device that compensates for component movement. The system also includes a display generator for generating in real-time superimposed oversteer targets on the displayed video images. The video images with oversteer targets assist the pilot in determining the airplane's actual position relative to runways, taxiways, obstacles and other ground features and to maneuver a plane with a wide wheel track long wheelbase, or both accordingly.

U.S. Pat. No. 6,415,219 introduces the invention which relates to the field of management of land-based vehicles on the airport territory using satellite positioning technologies. According to this prior art, the technique of real-time tracking and management of land-based vehicles of the airport includes creation of a geoinformation system of the airport territory, real-time determination of coordinates of vehicles using satellite positioning devices, control of speed and/or routes of vehicle movement and management of vehicle traffic. Additionally, state of vehicles and/or time of execution of works by each vehicle are controlled and movement of and execution of works by vehicles in accordance with time technological schedules of postflight servicing of aircrafts on the basis of daily plans of flights is handled. The geoinformation system of the airport territory is formed in the two-dimensional coordinates, and coordinates of vehicles are determined according to the relative geographic coordinates.

The foregoing prior arts disclose a portion of the invention explained hereinafter, however, do not disclose or indicate, by combining all these prior arts, a carrier consisting of a GPS navigation system which periodically produces a location data of said carrier, a data storage means which stores a plurality of three-dimensional data regarding a plurality of three-dimensional objects which reflect the objects in the real world, and a CPU which identifies the path of said carrier wherein said CPU compares said path with said plurality of three-dimensional data and outputs a warning sign or sound if one or more of said three-dimensional objects are within said path of said carrier thereby avoiding said carrier to collide one or more of said objects in the real world.

SUMMARY OF INVENTION

It is an object of the present invention to provide a system and method to prevent airplanes and/or other carriers from colliding into obstacles.

Still another object of the present invention to provide a system and method to prevent airplanes and/or other carriers from being sabotaged by terrorists.

The present invention introduces a carrier consisting of a GPS navigation system which periodically produces a location data of said carrier, a data storage means which stores a plurality of three-dimensional data regarding a plurality of three-dimensional objects which reflect the objects in the real world, and a CPU which identifies the path of said carrier wherein said CPU compares said path with said plurality of three-dimensional data and outputs a warning sign or sound if one or more of said three-dimensional objects are within said path of said carrier thereby avoiding said carrier to collide one or more of said objects in the real world.

The present invention also introduces an emergency landing system consisting of a host and a carrier wherein said carrier consists of an input means which inputs signals to navigate said carrier, a GPS navigation system which identifies the present location of said carrier, a storage means which stores a plurality of airport location data, an emergency signal is sent from said host, said input means is deactivated, said present location is identified by said GPS navigation system, one of said plurality of airport location data is selected, and said carrier initiates a landing process to the location represented by the selected data thereby enabling said carrier to safely land at the selected airport without the operation of said carrier being sabotaged by way of inputting signals to said input means.

The present invention further introduces a carrier consisting of an input means which inputs signals to navigate said carrier, a GPS navigation system which identifies the present location of said carrier, a storage means which stores a plurality of airport location data wherein an emergency signal is input from said input means, said input means is deactivated, said present location is identified by said GPS navigation system, one of said plurality of airport location data is selected, and said carrier initiates a landing process to the location represented by the selected data thereby enabling said carrier to safely land at the selected airport without the operation of said carrier being sabotaged by way of inputting signals to said input means.

BRIEF DESCRIPTION OF DRAWINGS

The above and other aspects, features, and advantages of the invention will be better understood by reading the following more particular description of the invention, presented in conjunction with the following drawings, wherein:

FIG. 1a is a simplified illustration illustrating an exemplary embodiment of the present invention.

FIG. 8b is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. The scope of the invention should be determined by referencing the appended claims.

As illustrated in FIG. 1a airplane 300 includes computer 200. Computer 200 is responsible of controlling the navigation of airplane 300.

Figure 1B:
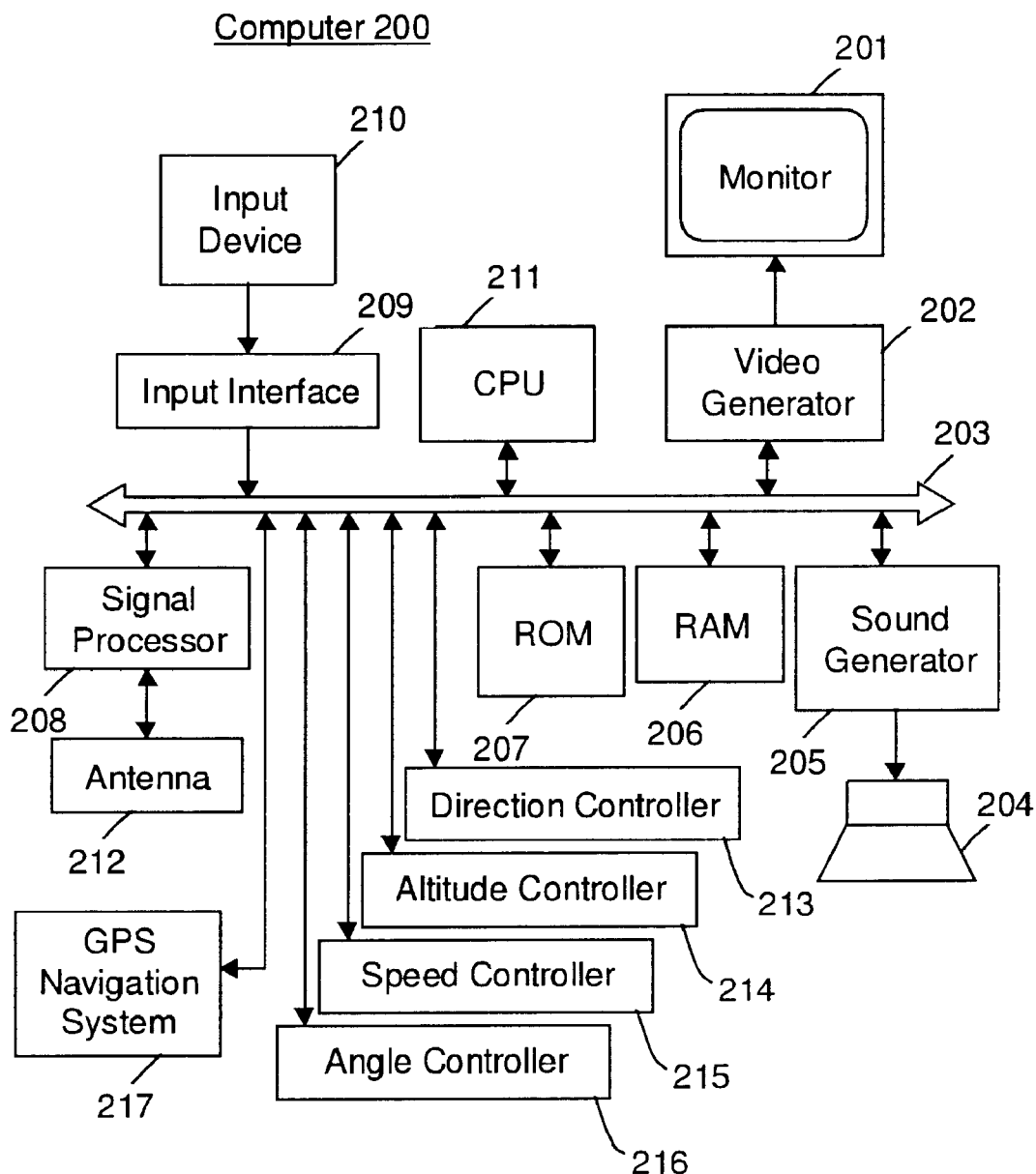
FIG. 1b is a block diagram illustrating an exemplary embodiment of the present invention.

FIG. 1b illustrates the block diagram of the computer installed in the cockpit portion of airplane 300. CPU 211 controls and administers the overall function and operation of computer 200. CPU 211 uses RAM 206 to temporarily store data and/or to perform calculation to perform its function. RAM 206 is also used to store a plurality of data and programs necessary to perform the present invention. Video generator 202 generates analog and/or digital video signals which are displayed on monitor 201. Sound generator 205 generates analog and/or digital audio signals that are transferred to speaker 204. ROM 207 stores data and programs which are necessary to perform the present invention. Antenna 212 sends and receives communication data, location data and various types of wireless signals. Signal processor 208 converts a stream of data produced by CPU 211 into a specific format (for example, data compression) in order to be sent by antenna 212 in a wireless fashion, and also converts a stream of wireless data received by antenna 212 into a specific format which is readable by CPU 211. Input signals are input by input device 210, such as keyboard, ON/OFF switches, joystick, and the signal is transferred to CPU 211 via input interface 209 and data bus 203. Direction controller 213 controls the direction of airplane 300 (FIG. 1a) in which computer 200 is installed under the control and administration of CPU 211. Altitude controller 214 controls the altitude of airplane 300 in which computer 200 is installed under the control and administration of CPU 211. Speed controller 215 controls the speed of airplane 300 in which computer 200 is installed under the control and administration of CPU 211. Angle controller 216 controls the angle of airplane 300 in which computer 200 is installed under the control and administration of CPU 211. GPS navigation system 217 calculates and identifies the present location of airplane 300 in the actual three-dimensional space by way of utilizing the method so-called "GPS" or "global positioning system."

Three-Dimensional/Map

Figure 2:
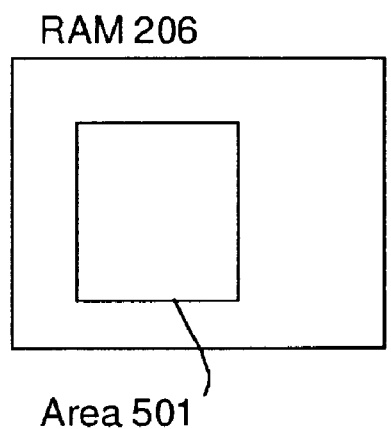
FIG. 2 a block diagram illustrating an exemplary embodiment of the present invention.

As illustrated in FIG. 2 RAM 206 includes area 501. Area 501 stores a three-dimensional map of the surface of the earth in a digital format. All of the objects stored as the part of the three-dimensional (3D) map reflect the actual objects exist in the real world, such as mountains, buildings, bridges, islands and other objects which have height of more than one foot above sea level. These objects are stored in area 501 in three-dimensional format and height, width, and depth of each object are utilized for performing the present invention.

Figure 3:
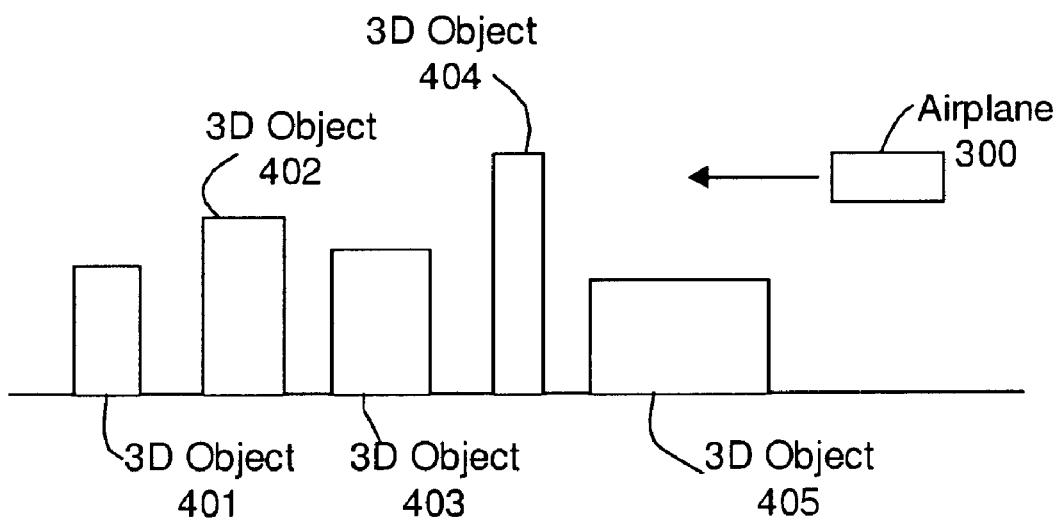
FIG. 3 is a simplified illustration illustrating an exemplary embodiment of the present invention.

FIG. 3 illustrates the method of utilizing the three-dimensional (3D) map stored in area 501 (FIG. 2). In the example illustrated in FIG. 3 several objects, such as buildings, exist in the three-dimensional space, i.e., object 401, object 402, object 403, object 404, and object 405. GPS navigation system 217 (FIG. 1a) identifies the actual location of airplane 300 and applies the location data to the three-dimensional map stored in area 501. In the present example the altitude of airplane 300 exceeds the heights of objects 401, 402, 403, and 405, but does not exceed the height of object 404. Assuming that all of these objects are located on the path of airplane 300. If airplane 300 does not alter its course it will result in colliding with object 404.

Figure 4:
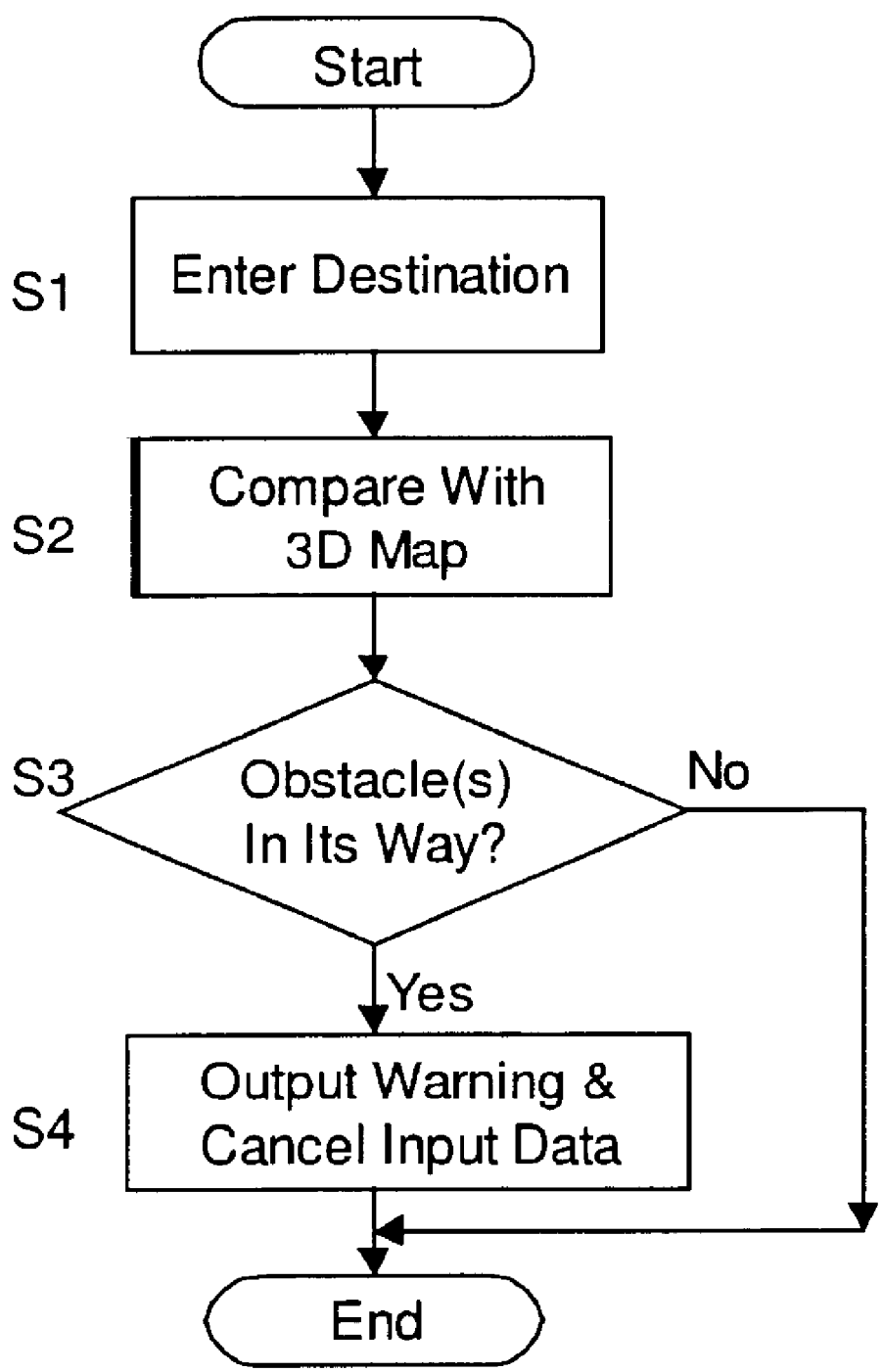
FIG. 4 is a flowchart illustrating an exemplary embodiment of the present invention.

FIG. 4 illustrates the method of airplane 300 to avoid colliding with any objects during actual flight before such flight is initiated. The destination data which represents the destination of airplane 300 is manually input by input device 210 (FIG. 1b) (S1). CPU 211 (FIG. 1b) calculates the course to the destination based on the destination data and compares with the three-dimensional data stored in area 501 of RAM 206 (FIG. 2) (S2). If any of the objects stored in area 501, which is in the path of airplane 300, is higher than its navigation altitude (S3) CPU 211 outputs a warning sign and/or sound from monitor 201 (FIG. 1b) and/or speaker 204 (FIG. 1b) and cancels the input data input from input device 210 (S4).

Figure 5:
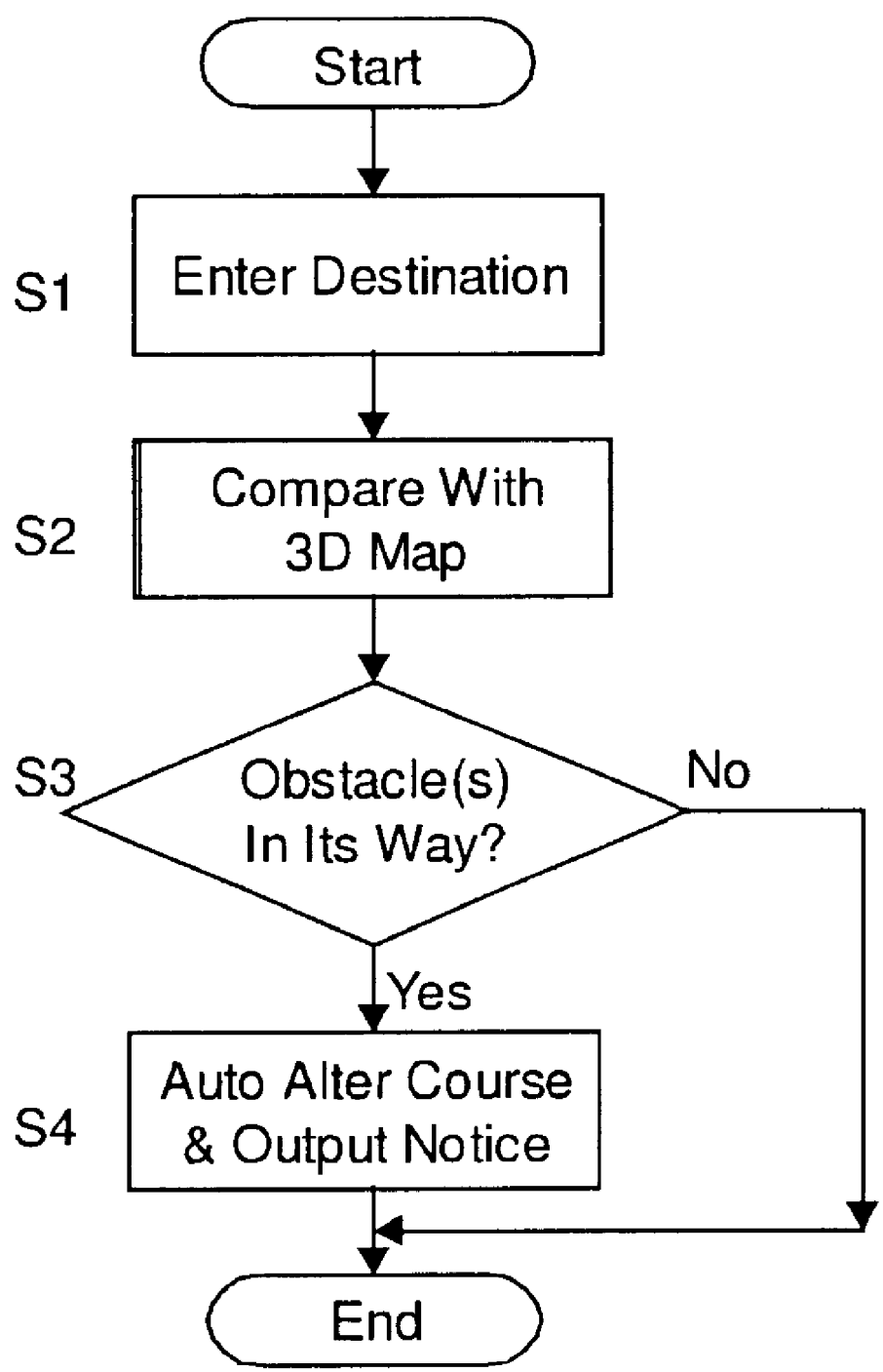
FIG. 5 is a flowchart illustrating an exemplary embodiment of the present invention.

FIG. 5 illustrates another method of airplane 300 to avoid colliding with any objects during actual flight before such flight is initiated. The destination data which represents the destination of airplane 300 is manually input by input device 210 (FIG. 1b) (S1). CPU 211 (FIG. 1b) calculates the course to the destination based on the destination data and compares with the three-dimensional data stored in area 501 of RAM 206 (FIG. 2) (S2). If any of the objects stored in area 501, which is in the path of airplane 300, is higher than its navigation altitude (S3) CPU 211 calculates an alternative course to the destination and outputs a notice sign and/or sound which indicates that the course has been altered from monitor 201 (FIG. 1b) and/or speaker 204 (FIG. 1b) (S4).

Figure 6:
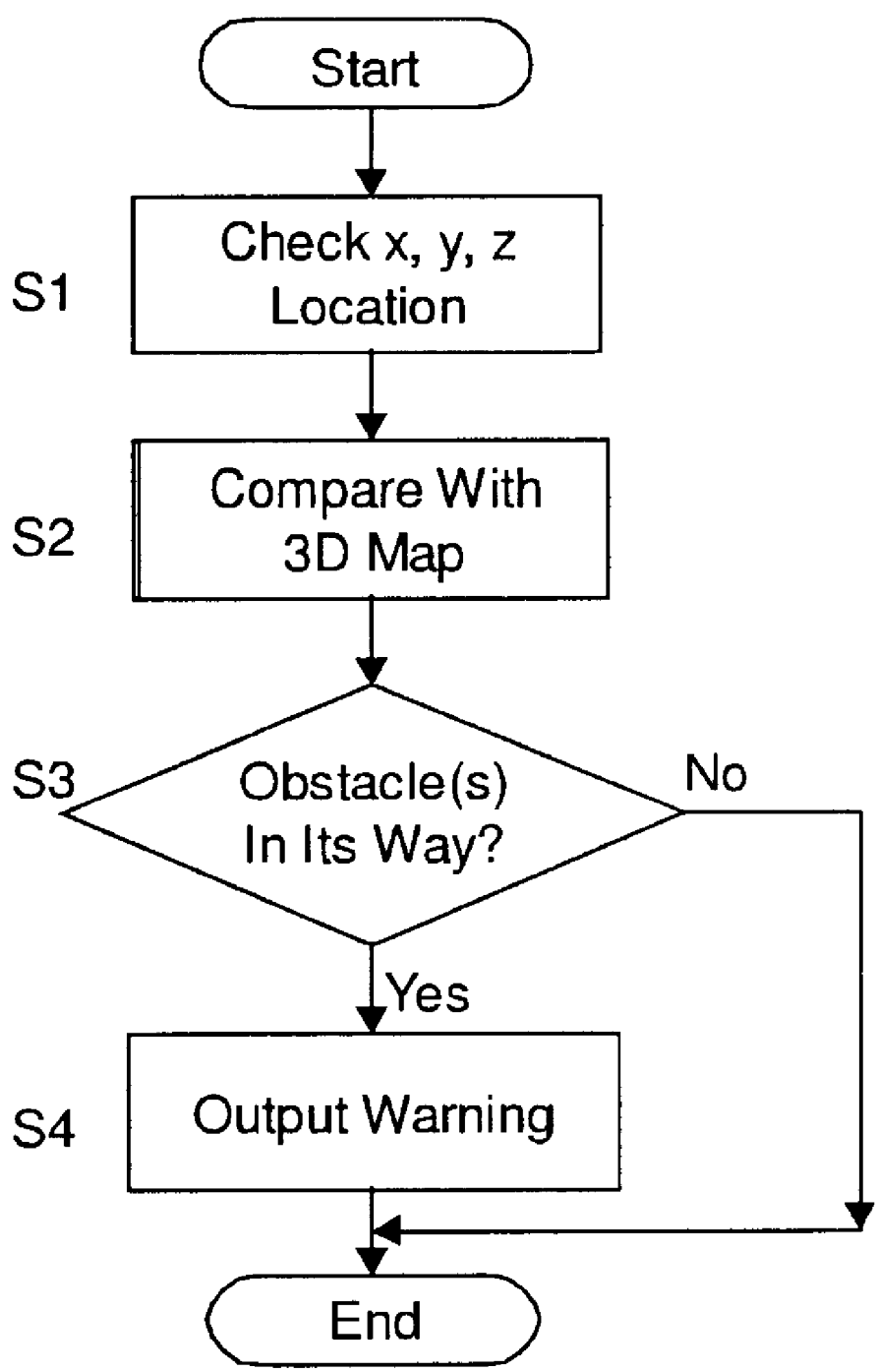
FIG. 6 is a flowchart illustrating an exemplary embodiment of the present invention.

FIG. 6 illustrates the method of airplane 300 to avoid colliding with any objects during an actual flight after such flight is initiated. CPU 211 (FIG. 1b) periodically checks the present location of airplane 300 during flight by utilizing the navigation data received from GPS navigation system 217 (FIG. 1b) via data bus 203 (FIG. 1b) (S1). Such navigation data is periodically compared with the three-dimensional data stored in area 501 of RAM 206 (FIG. 2) (S2). If any of the objects stored in area 501, which is in the path of airplane 300, is higher than its navigation altitude (S3) CPU 211 outputs a warning sign and/or sound from monitor 201 (FIG. 1b) and/or speaker 204 (FIG. 1b) (S4).

Figure 7:
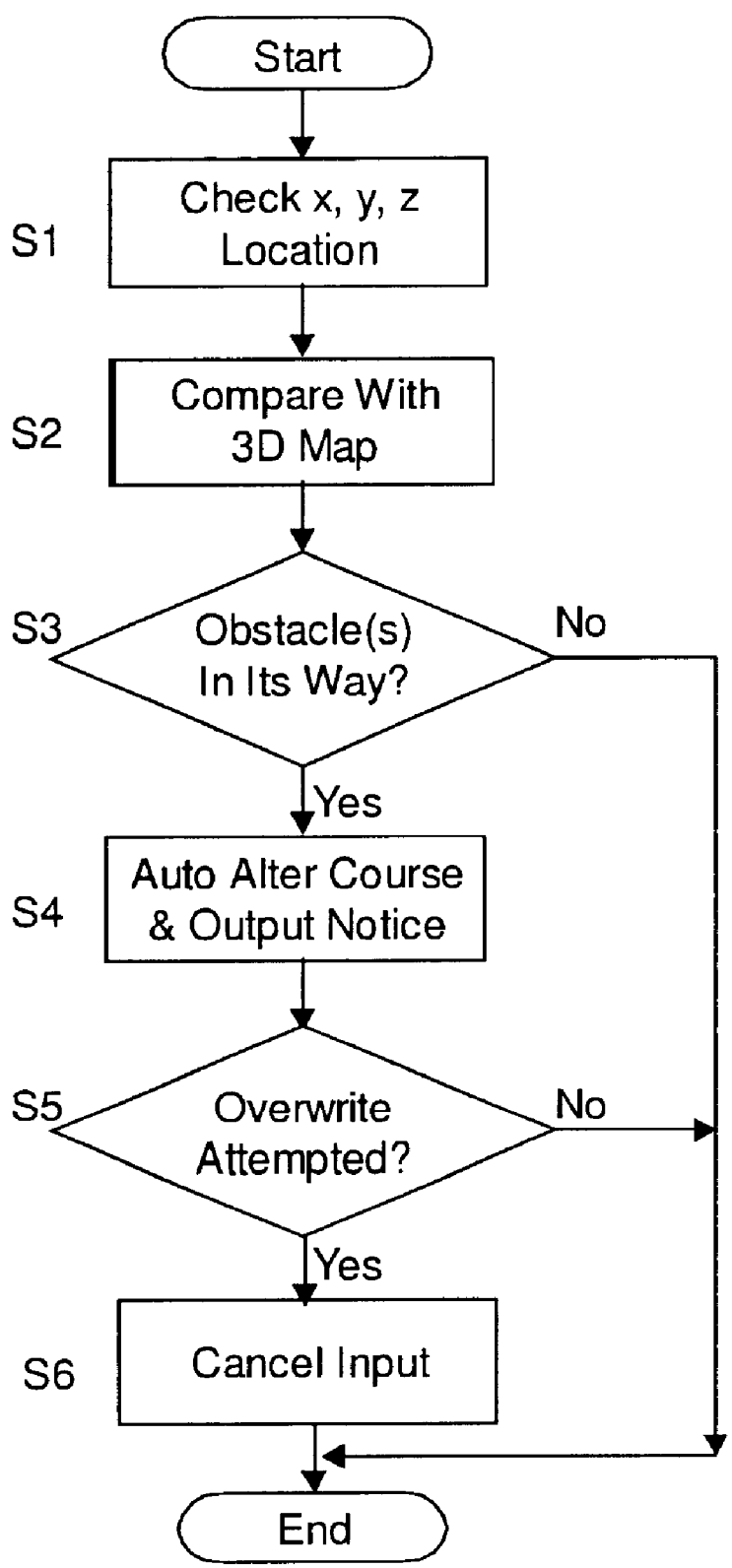
FIG. 7 is a flowchart illustrating an exemplary embodiment of the present invention.

FIG. 7 illustrates another method of airplane 300 to avoid colliding with any objects during actual flight after such flight is initiated. CPU 211 (FIG. 1b) periodically checks the present location of airplane 300 during flight by utilizing the navigation data received from GPS navigation system 217 (FIG. 1b) vial data bus 203 (FIG. 1b) (S1). Such navigation data is periodically compared with the three-dimensional data stored in area 501 of RAM 206 (FIG. 2) (S2). If any of the objects stored in area 501, which is in the path of airplane 300, is higher than its navigation altitude (S3) CPU 211 calculates an alternative course to the destination and outputs a notice sign and/or sound which indicates that the course has been altered from monitor 201 (FIG. 1b) and/or speaker 204 (FIG. 1b) (S4). If the alternative course is attempted to be overwritten by signal input from input device 210 (FIG. 1b) (S5) CPU 211 cancels such input signal (S6).

Remote Controlling System

FIG. 8a through FIG. 10 illustrates the remote controlling system of airplane 300.

Figure 8A:
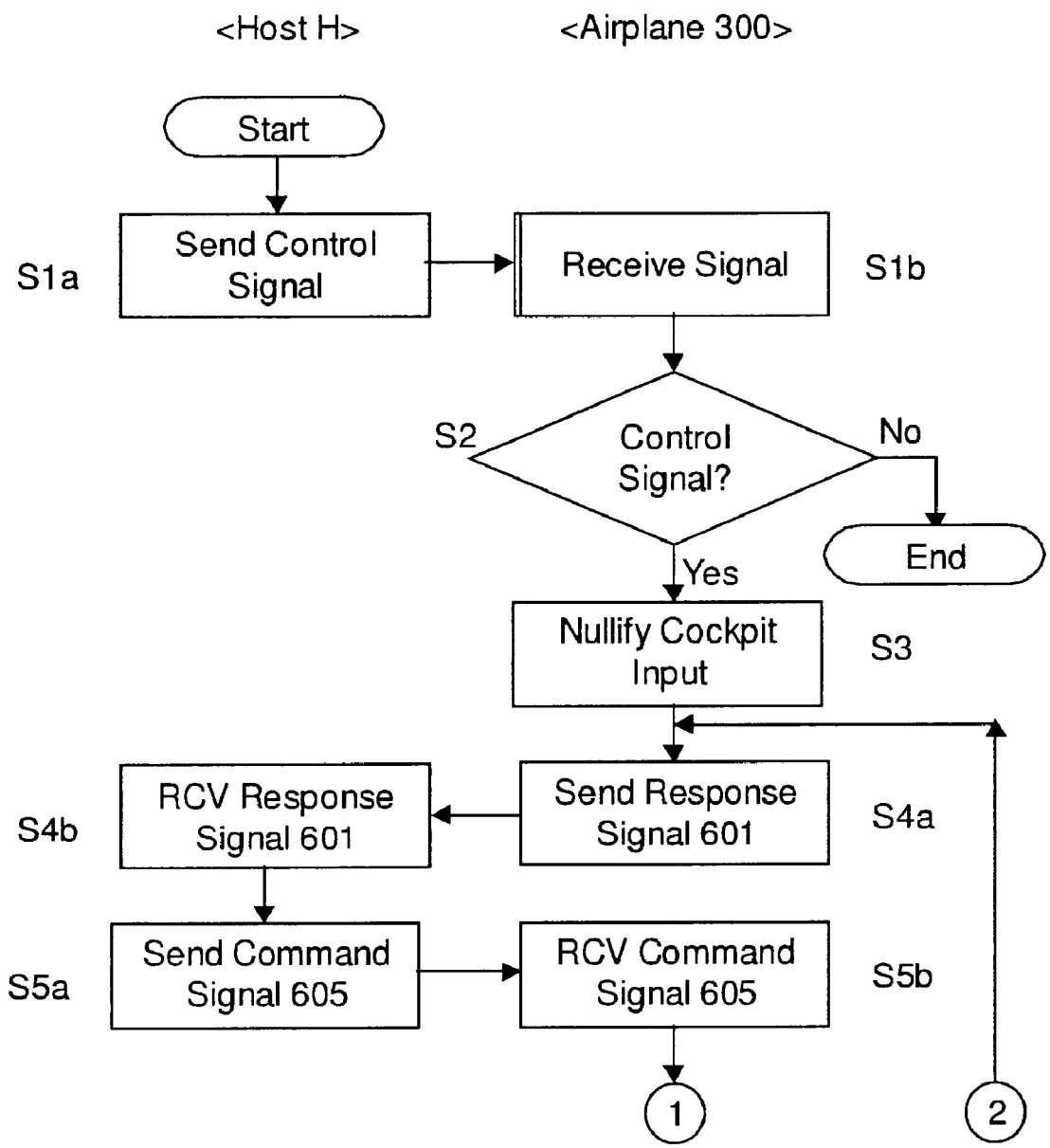
FIG. 8a is a flowchart illustrating an exemplary embodiment of the present invention.

As illustrated in FIG. 8a and FIG. 8b airplane 300 may be remotely controlled by host H. Host H includes a computer system same or similar to computer 200 (FIG. 1b) which enables to remotely control airplane 300 by signals input from input device same or similar to input device 210 (FIG. 1b). When remote controlling system is initiated host H which is located in a remote location sends a control signal to airplane 300 in a wireless fashion (S1a). Airplane 300 periodically receives various types of signals via antenna 212 (FIG. 1b). The received signal is processed (e.g., decompressed) by signal processor 208 (FIG. 1b) and is transferred to CPU 211 (FIG. 1b) via data bus 203 (FIG. 1b) (S1b). If CPU 211 determines that the received signal is a control signal produced by host H (S2) all of the signals input from input device 210 (FIG. 1b) thereafter are blocked and nullified (S3). CPU 211 sends response signal 601 (S4a), which is received by host H (S4b). Then host H sends a command signal (S5a), which is received by airplane 300 in the manner described in S1b above (S5b). CPU 211 operates airplane 300 in compliance with command signal 605 received from host H (S7). The sequence of 54a through S7 is repeated until a cancellation signal which indicates to deactivate the remote controlling system is included in command signal 605 (S6). Once the remote controlling system is deactivated signal input from input device 210 (FIG. 1b) is valid thereafter and operation of airplane 300 from its cockpit is resumed (S8).

Figure 9:
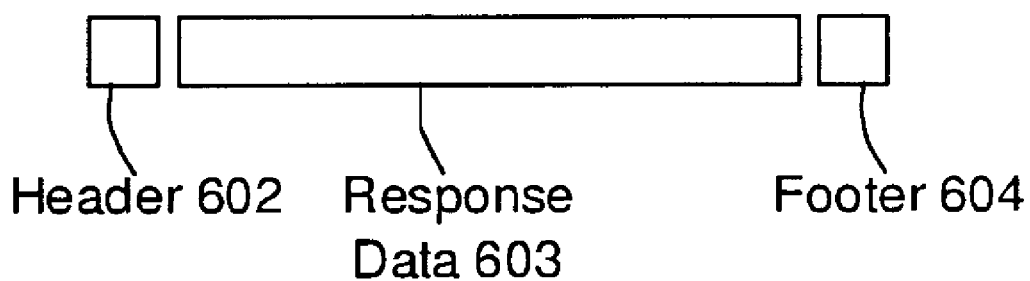
FIG. 9 is a simplified illustration illustrating an exemplary embodiment of the present invention.

FIG. 9 illustrates the basic structure of response signal 601 described in S4a and S4b in FIG. 8a. Response signal 601 is composed of header 602, response data 603, and footer 604. Header 602 and footer 604 indicate the beginning and end of response signal 601. Response data 603 includes data regarding the present altitude, speed, direction, and angle of airplane 300.

Figure 10:
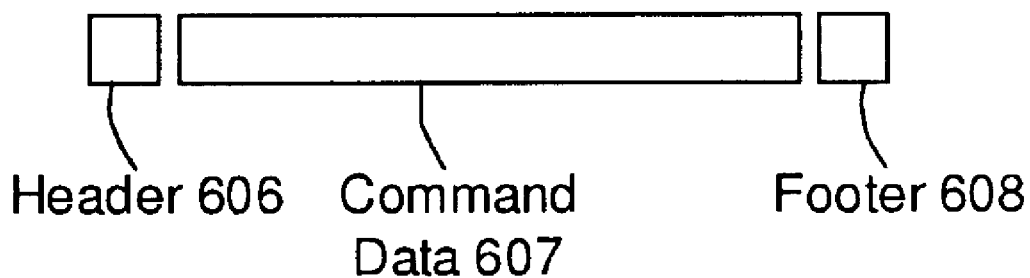
FIG. 10 is a simplified illustration illustrating an exemplary embodiment of the present invention.

FIG. 10 illustrates the basic structure of command signal 605 described in S5a and S5b in FIG. 8a. Command signal 605 is composed of header 606, command data 607, and footer 608. Header 606 and footer 608 indicate the beginning and end of command signal 605. Command data 607 includes data regarding the renewed altitude, speed, direction, and angle of airplane 300. As another embodiment command data 607 may include the data regarding destination instead. The remote controlling system is cancelled if command data 607 includes a cancellation signal instead of data regarding renewed altitude, speed, direction, and angle of airplane 300.

Emergency Landing System

Figure 11:
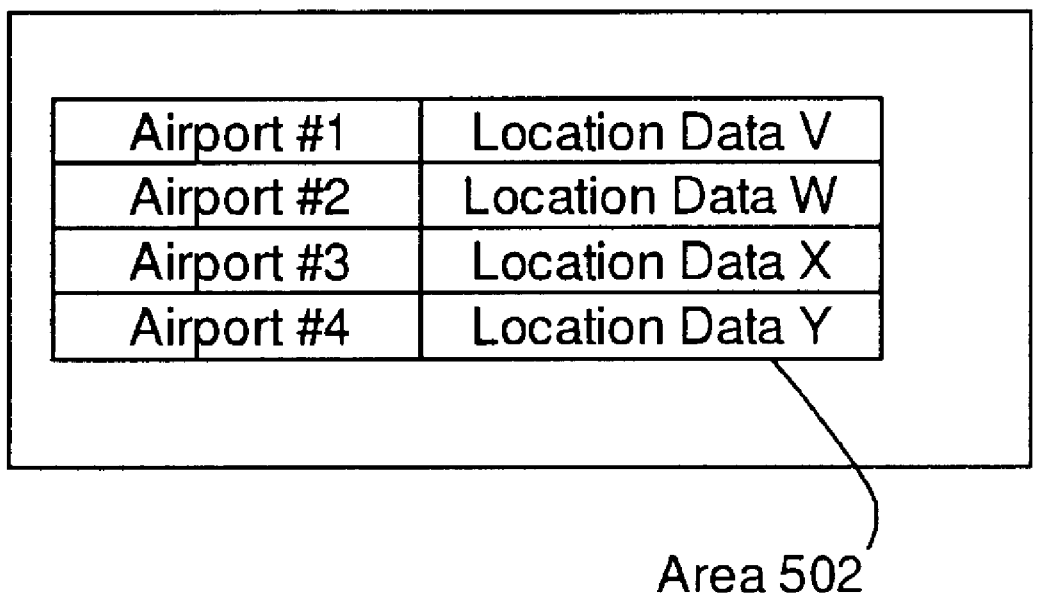
FIG. 11 is a block diagram illustrating an exemplary embodiment of the present invention.
Figure 12A:
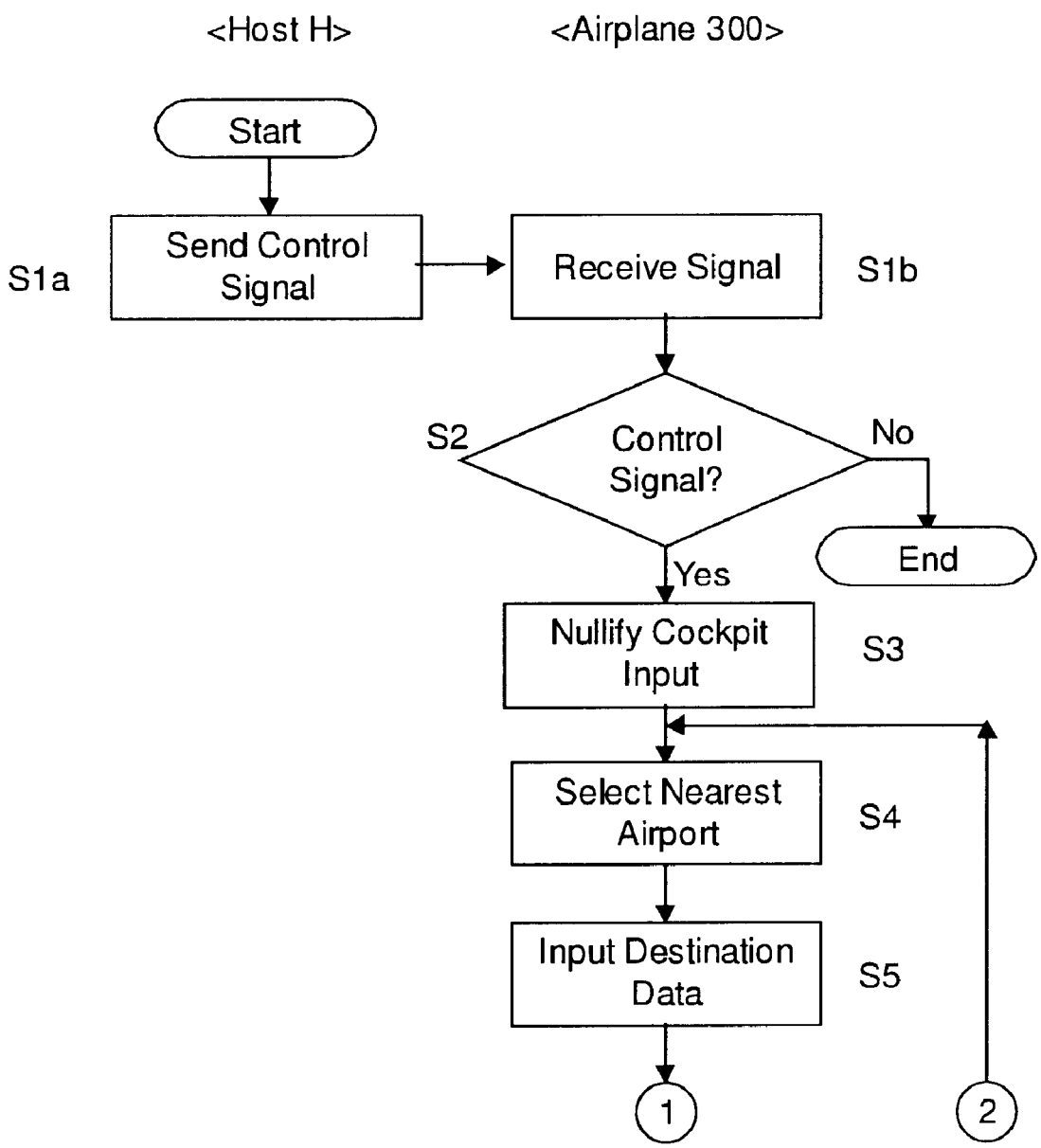
FIG. 12a is a flowchart illustrating an exemplary embodiment of the present invention.
Figure 12B:
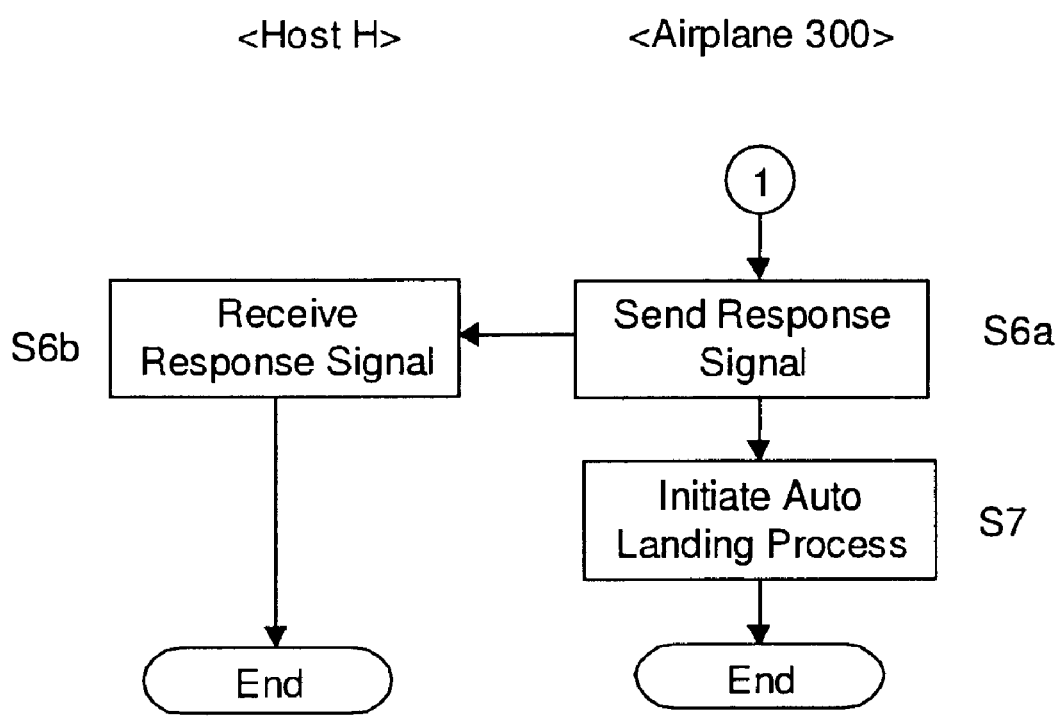
FIG. 12b is a flowchart illustrating an exemplary embodiment of the present invention.

FIG. 11 through FIG. 12b illustrate the emergency landing system of airplane 300.

As illustrated in FIG. 11 RAM 206 includes area 502. Area 502 stores a plurality of location data representing the locations of a plurality of airports. Here the term airport includes any facility which is capable of landing airplanes, space shuttles, gliders, and any other carriers. In the present example location data V represents the location of airport #1, location data W represents the location of airport #2, location data X represents the location of airport #3, and location data Y represents the location of airport #4. The plurality of location data are linked with three-dimensional map stored in area 501 of RAM 206 (FIG. 2), therefore, these location data can be identified on the three-dimensional map stored in area 501.

FIG. 12a and FIG. 12b illustrate the emergency landing system by utilizing the location data stored in area 502 of RAM 206 (FIG. 11). Host H which is located in a remote location sends a control signal to airplane 300 in a wireless fashion (S1a). Airplane 300 periodically receives various types of signals via antenna 212 (FIG. 1b). The received signal is processed (e.g., decompressed) by signal processor 208 (FIG. 1b) and transferred to CPU 211 (FIG. 1b) via data bus 203 (FIG. 1b) (S1b). If CPU 211 determines that the received signal is a control signal produced by host H (S2) all of the signals input from input device 210 (FIG. 1b) thereafter are blocked and nullified (S3). CPU 211 identifies the present location by utilizing GPS navigation system 217 (FIG. 1b) and compares with the location data stored in area 502 of RAM 206 (FIG. 11). CPU 211 selects the nearest airport and inputs the location data of the selected airport as the new destination (S5). Airplane 300 sends a response signal (S6a), which is received by host H (S6b), and airplane 300 initiates an automatic landing process to the location of the selected airport (S7). As another embodiment of the present invention the location data can be selected manually by utilizing input device 210 and render input device 210 remain activated only for that purposes, and select the nearest airport only when no airport was selected within a specified time. Or as another embodiment airplane 300 may select a predetermined location and initiate the automatic landing process thereto.

As another embodiment of the present invention the emergency landing system can be performed without involving host H. This embodiment is not shown in any drawings. CPU 211 (FIG. 1b) periodically checks the signal from input device 210 (FIG. 1b). If an emergency signal is input from input device 210 which indicates that airplane 300 must be landed at the nearest airport all of the signals input from input device 210 (FIG. 1b) thereafter are blocked and nullified. CPU 211 identifies the present location by utilizing GPS navigation system 217 (FIG. 1b) and compares with the location data stored in area 502 of RAM 206 (FIG. 11). CPU 211 selects the nearest airport and inputs the location data of the selected airport as the new destination and initiates an automatic landing process to the location of the selected airport. As another embodiment of the present invention the location data can be selected manually by utilizing input device 210 and render input device 210 remain activated only for that purposes, and select the nearest airport only when no airport was selected within a specified time. Or as another embodiment airplane 300 may select a predetermined location and initiate the automatic landing process thereto.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A carrier comprising a destination data input means, a 3D artificial structure data storage means, a CPU, wherein a destination data representing the destination of said carrier is input via said destination data input means, said 3D artificial structure data storage means stores a plurality of 3D artificial structure data regarding a plurality of three-dimensional artificial structures which reflect the artificial structures in the real world, and said CPU identifies a guiding-to-the-destination path which represents the path to the destination indicated by said destination data, and compares said guiding-to-the-destination path with said plurality of 3D artificial structure data, and said carrier outputs a warning sign if one or more of said three-dimensional artificial structures are within said guiding-to-the-destination path of said carrier.

2. The carrier of claim 1, wherein said destination data representing the destination of said carrier is input via said destination data input means before said carrier takes off the ground.

3. The carrier of claim 1, wherein said CPU calculates an alternative course if one or more of said three-dimensional artificial structures are within said guiding-to-the-destination path of said carrier.

4. The carrier of claim 1, wherein said carrier is remotely controllable by a computer.

5. The carrier of claim 1, wherein said carrier comprises an emergency landing system.

6. A carrier comprising a destination data input means, a 3D object data storage means, a CPU, wherein a destination data representing the destination of said carrier is input via said destination data input means, said 3D object data storage means stores a plurality of 3D object data regarding a plurality of three-dimensional objects which reflect the artificial structures in the real world, and said CPU identifies a guiding-to-the-destination path which represents the path to the destination indicated by said destination data, and compares said guiding-to-the-destination path with said plurality of 3D object data, and said carrier outputs a warning sign if one or more of said three-dimensional artificial structures are within said guiding-to-the-destination path of said carrier.

* * * * *